United States Patent [19]

Miki et al.

[11] Patent Number: 4,692,886
[45] Date of Patent: Sep. 8, 1987

[54] DIGITAL PATTERN GENERATOR

[75] Inventors: Yasuhiko Miki; Kentaro Takita, both of Tokyo, Japan

[73] Assignee: Sony/Tektronix Corporation, Tokyo, Japan

[21] Appl. No.: 694,599

[22] Filed: Jan. 24, 1985

[30] Foreign Application Priority Data

May 7, 1984 [JP] Japan .................................. 59-90445

[51] Int. Cl.$^4$ .......................... G06F 1/02; G10H 1/00
[52] U.S. Cl. ........................................ 364/718; 84/1.01
[58] Field of Search .............................. 364/718-722, 364/900 MS File; 84/1.01, 1.03

[56] References Cited

U.S. PATENT DOCUMENTS

| 4,198,683 | 4/1980 | Dagostino | 364/900 |
|---|---|---|---|
| 4,213,366 | 7/1980 | Niimi et al. | 84/1.01 |
| 4,328,731 | 5/1982 | Gotho et al. | 84/1.01 |
| 4,342,245 | 8/1982 | Gross | 364/718 |
| 4,384,504 | 5/1983 | Deforeit | 84/1.01 |
| 4,437,379 | 3/1984 | Okumura | 84/1.01 |
| 4,438,502 | 3/1984 | Fox et al. | 84/1.01 |
| 4,483,229 | 11/1984 | Tsukamoto et al. | 84/1.01 |

Primary Examiner—Gary V. Harkcom
Assistant Examiner—Long Thanh Nguyen
Attorney, Agent, or Firm—Dellett, Smith-Hill and Bedell

[57] ABSTRACT

A digital pattern generator generates various kinds of digital pattern signals. A first memory stores an execution signal, an area control signal and a digital pattern. A program counter generates a first address signal in accordance with the execution signal read from the first memory and a first clock signal, and the first memory is addressed by the first address signal. Thus, the pattern generator operates as a microprogram type generator. A second memory includes a plurality of memory areas each storing a digital pattern, and a capacity of each the memory area corresponds to that of the first memory. When the second memory is addressed by a second address signal from an address counter, the pattern generator operates as a sequential type generator. When the memory area of the second memory is selected by the area control signal read from the first memory and the selected memory area is addressed by the first address signal, the second memory acts as an auxiliary memory of the first memory.

9 Claims, 1 Drawing Figure

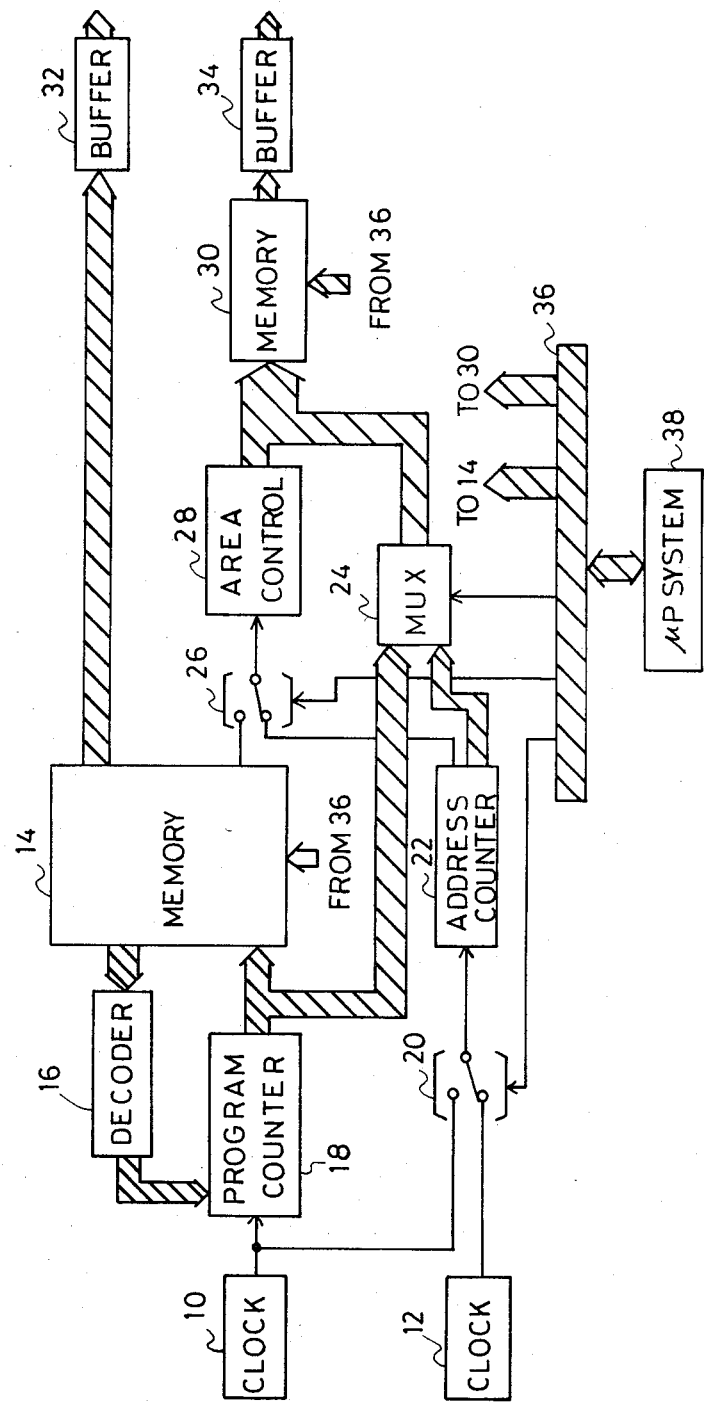

DIGITAL PATTERN GENERATOR

BACKGROUND OF THE INVENTION

The present invention relates to a digital pattern generator which generates various kind of digital pattern signals.

A digital pattern generator generates a digital pattern signal for testing a digital apparatus, such as a digital integrated circuit or the like. There are two kinds of conventional digital pattern generators. One of them is a microprogram type digital pattern generator disclosed in Japanese Patent Publication Nos. 46095/74, 12428/78, 39728/78 and 39729/78 and Japanese Laid Open Patent Application No. 204955/82. The other one is a sequential type digital pattern generator disclosed in Japanese Patent Publication No. 2252/77 and Japanese Laid Open Patent Application Nos. 92068/79 and 128646/79. In the microprogram type pattern generator, a memory stores digital patterns and microcodes, such as "jump", "if jump" and other instructions. The digital pattern signals are obtained from the memory by controlling a program counter in accordance with the microcode read out from the memory and addressing the memory in response to the output from the program counter. The microprogram type pattern generator can generate complex and long pattern signals because the same digital pattern can be used many times in accordance with program, and in this type pattern generator it is easy to set the pattern because of the program system. On the other hand, the sequential type pattern generator generates the digital pattern signals by storing digital patterns to be generated in a memory in order and reading the patterns in the memory sequentially. An advantage of this sequential type pattern generator is that a memory control circuit is simple in construction.

Japanese Laid Open Patent Application No. 140439/81 discusses a prior art which expands functions of the digital pattern generator by combining the microprogram and sequential type pattern generators. In this prior art, the program counter of the microprogram type controls the memories of both the microprogram and sequential types. According to this combination, a repeated pattern can be generated conveniently by a use of the microprogram type pattern generator. However, it is difficult to apply this combination type pattern generator to many applications, because addresses from the program counter correspond to digital patterns in the memory of the sequential type pattern generator and only one of the microprogram and sequential types can be used at the same time.

SUMMARY OF THE INVENTION

A digital pattern generator of the present invention includes a first memory for storing an execution control signal, an area control signal and digital patterns, a first clock generator for generating a first clock signal, a program counter for generating a first address signal in response to the first clock signal and the execution control signal read from the first memory. A microprogram type pattern generator is constructed by the first memory, first clock generator and program counter. The present invention further includes a second memory having a plurality of memory areas each storing digital patterns, a second clock generator for generating a second clock signal and an address counter for generating a second address signal by counting the first clock signal or the second clock signal. The capacity of each the memory area of the second memory corresponds to that of the first memory. First selection means is provided for selecting the first address signal or a first part of the second address signal. Second selection means selects the remainder (second) part of the second address signal or the area control signal read from the first memory for selecting the memory area of the second memory. The selected memory area of the second memory is addressed by the output signal from the first selection means. When the first and second selection means select respectively the first and second parts of the second address signal, a sequential type pattern generator is constructed by the second memory, the address counter, etc. When the first and second selection means select respectively the program counter and the first memory, the second memory acts as an expansion memory for the first memory. Thus, the digital pattern generator of the present invention can be applied to many applications.

It is therefore an object of the present invention to provide a digital pattern generator which combines microprogram and sequential type pattern generators for expanding functions of the pattern generator.

Other objects and advantages of the present invention will become apparent to those having ordinary skill in the art when taken in conjunction with the accompanying drawing.

DRAWING

A single drawing shows a block diagram of the one preferred embodiment according to the present invention.

DETAILED DESCRIPTION OF THE INVENTION

Referring to the single drawing, first and second variable clock generators 10 and 12 generate first and second clock signals, respectively, frequencies of the first and second clock signals being variable. A first memory 14 is a random access memory (RAM) which stores words each consisting of an execution control signal, an area control signal and a digital pattern. The execution control signal represents, for example, "jump", "if jump" or other instructions. The combination of the execution control signal and the area control signal is a microcode. The capacity of the memory 14 is, for example, 1K words. A decoder 16 decodes the execution control signal read from the first memory 14 for obtaining the next address of the jump instruction or the like. A program counter 18 receives the first clock signal from the first clock generator 10 and the next address from the decoder 16 at clock and preset terminals, respectively, and applies an output signal as a first address signal to the first memory 14.

An electronic switch 20 selects the first clock signal from the first clock generator 10 or the second clock signal from the second clock generator 12. An address counter 22 counts the clock signal selected by the electronic switch 20, and the counted output is a second address signal. A multiplexer 24 as first selection means selects the first address signal from the program counter 18 or a first part of the second address signal (for example, excluding a carry or the most significant bit) from the address counter 22. An electronic switch 26 as second selection means selects the area control signal (one bit) read from the first memory 14 or the remainder (second) part of the second address signal (for example, the carry or the most significant bit: one bit) from the address counter 22. An area control circuit 28 is, for example, a counter which counts one bit pulse from the electronic switch 26. A second memory 30 is, for example, a RAM which includes a plurality of memory areas each storing digital patterns. The capacity of each memory area is equal to that of the first memory 14. The counted output from the area control circuit 28 is applied to the higher order bits of the address terminal of the second memory 30 for selecting the memory area thereof, and the address signal from the multiplexer 24 is applied to the lower order bits of the address terminal of the memory 30 for determining the address in the selected memory area. For example, the capacity of the memory 30 is 8K words, ie., eight 1K-word memory areas are provided.

Buffers 32 and 34 receive the digital pattern signals from the first memory 14 and the second memory 30, respectively, and these pattern signals are applied to a circuit under test. A microprocessor system 38 is connected to a bus 36, and it is constructed by a microprocessor, a read only memory for storing program for the microprocessor, a RAM as a temporary memory and a keyboard as an input device. The system 38 writes the microcodes (the execution control signal and the area control signal) and the digital patterns in the first memory 14, writes the digital patterns in the second memory 30 and controls the electronic switches 20 and 26 and the multiplexer 24. The microprocessor system 38 may control oscillation frequencies of the clock generators 10 and 12 (control lines are not shown).

The first memory 14, the first clock generator 10, the decoder 16 and the program counter 18 act as a microprogram type digital pattern generator which generates a digital pattern signal that is applied to the buffer 32. When the electronic switches 20 and 26 select the second clock generator 12 and the address counter 22 and the multiplexer 24 selects the address counter 22, the second memory 30 is addressed sequentially from the first location of the first memory area to the last location of the last (eighth) memory area for applying the stored digital pattern to the buffer 34. The frequency of the digital pattern signal from the buffer 34 is independent of that of the digital pattern signal from the buffer 32. When the electronic switch 20 selects the first clock generator 10, the output pattern from the buffer 34 is independent of the output signal from the buffer 32, but the frequencies thereof are equal to each other.

If the electronic switch 26 selects the first memory 14, the area control circuit (counter) 28 is incremented by the first memory 14 for renewing the memory area of the second memory 30, i.e., the next memory area is selected every time when the first memory 14 generates the area control signal. Thus, the memory area of the second memory 30 is controlled in accordance with the microcode (area control signal) of the first memory 14. In other words, the area control signal of the corresponding word in the first memory 14 is "1" when the memory area is renewed, and the area control signal is "0" when the memory area is not renewed. When the multiplexer 24 selects the program counter 18, this counter 18 addresses locations of each the memory area of the second memory 30. Thus, when the electronic switch 26 selects the first memory 14 and the multiplexer 24 selects the program counter 18, the second memory 30 acts as the extension memory of the first memory 14 and the memory area is controlled by the microcode.

As described hereinbefore, the electronic switches 20 and 26 and the multiplexer 24 can be controlled independently, many combinations thereof are possible, and the second memory 30 can be used for many purposes.

According to the present invention, the second memory includes many memory areas, and each memory area can be selected by the area control signal from the first memory or the second part of the second address signal from the address counter. The locations of each memory area of the second memory can be addressed by the first address signal from the program counter or the first part of the second address signal. The frequency of the second address signal can be set to be equal to or different from that of the first address signal. Thus, the present invention can expand the functions of the digital pattern generator with these combinations.

While we have shown and described herein the preferred embodiment of our invention, it will be apparent to those skilled in the art that many changes and modifications may be made without departing from our invention in its broader aspects. For example, the area control signal from the first memory and the second part of the second address signal from the address counter may consist of a plurality of bits and the area control circuit may be a register for selecting a desired memory area of the second memory directly. If the memory area selection signals from the first memory and the address counter are latched, the register may not be necessary. A plurality of second memories may be provided in parallel, and the selection means may be a mechanical switch.

What we claim as being novel is:

1. A digital pattern generator comprising:
   a first memory for storing an execution control signal, an area control signal and a digital pattern;
   a clock generator for generating a clock signal;
   a program counter for generating a first address signal in accordance with said clock signal from said clock generator and said execution control signal from said first memory, said first address signal addressing said first memory;
   an address counter for generating a second address signal by counting said clock signal from said clock generator; and
   a second memory having a plurality of memory areas each storing a digital pattern, one of said memory areas being selected in accordance with said area control signal from said first memory, and the selected memory area being addressed by said second address signal from said address counter;
   whereby first and second digital patterns are derived from said first and second memories respectively.

2. A digital pattern generator according to claim 1 further including an area control circuit for selecting one of said memory areas of said second memory in response to said area control signal from said first memory.

3. A digital pattern generator according to claim 2, wherein said area control circuit is a counter for counting said area control signal from said first memory, the counted output from said counter selecting one of said memory areas of said second memory.

4. A digital pattern generator according to claim 2, wherein said area control circuit is a register for storing said area control signal from said first memory, the stored area control signal selecting one of said memory areas of said second memory.

5. A digital pattern generator comprising:

a first memory for storing an execution control signal, an area control signal and a digital pattern;

a clock generator for generating a clock signal;

a program counter for generating an address signal in accordance with said clock signal from said clock generator and said execution control signal from said first memory, said first address signal addressing said first memory; and a second memory having a plurality of memory areas each storing a digital pattern, one of said memory areas being selected in accordance with said area control signal from said first memory, and the selected memory area being addressed by said address signal from said program counter;

whereby first and second digital patterns are derived from said first and second memories respectively.

6. A digital pattern generator according to claim 5 further including an area control circuit for selecting one of said memory areas of said second memory in response to said area control signal from said first memory.

7. A digital pattern generator according to claim 6, wherein said area control circuit is a counter for counting said area control signal from said first memory, the counted output from said counter selecting one of said memory areas of said second memory.

8. A digital pattern generator according to claim 6, wherein said area control circuit is a register for storing said area control signal from said first memory, the stored area control signal selecting one of said memory areas of said second memory.

9. A digital pattern generator, comprising:

a first memory for storing an execution control signal an area control signal and a digital pattern;

a clock generator for generating a clock signal;

a program counter for generating a first address signal in accordance with said clock signal from said clock generator and said execution control signal from said first memory, said first address signal addressing said first memory;

an address counter for generating a second address signal by counting said clock signal from said clock generator;

selection means for selecting one of said first address signal from said program counter and said second address signal from said address counter; and a second memory having a plurality of memory areas each storing a digital pattern, one of said memory areas being selected in accordance with said area control signal from said first memory, and the selected memory area being addressed by the address signal selected by said selection means.

* * * * *